United States Patent [19]

Koch et al.

[11] Patent Number: 5,615,641
[45] Date of Patent: Apr. 1, 1997

[54] INTERNAL-COMBUSTION ENGINE CYLINDER HEAD

[75] Inventors: Dietrich Koch, Teunang; Werner Leicht, Stetten; Norbert Wand, Friedrichshafen, all of Germany

[73] Assignee: MTU Motoren- Und Turbinen-Union Friedrichshafen GmbH, Friedrichshafen, Germany

[21] Appl. No.: 487,533

[22] Filed: Jun. 7, 1995

[30] Foreign Application Priority Data

Jun. 9, 1994 [DE] Germany .......................... 44 20 130.3

[51] Int. Cl.⁶ .................................................. F02F 1/36
[52] U.S. Cl. ............................................... 123/41.82 R
[58] Field of Search ................................ 123/41.82 R

[56] References Cited

U.S. PATENT DOCUMENTS 4,131,093 12/1978 Mansfield .................. 123/41.82 R
4,377,990 3/1983 Seidl ........................... 123/41.82 R

FOREIGN PATENT DOCUMENTS 2021691 12/1979 United Kingdom .

*Primary Examiner*—Noah P. Kamen
*Attorney, Agent, or Firm*—Evenson, McKeown, Edwards & Lenahan, P.L.L.C.

[57] ABSTRACT

A cylinder head has four valves and an injection valve arranged in the center thereof for an internal-combustion engine particularly for a diesel engine. The cylinder head includes a closed runner which is arranged concentrically with respect to an axis of the injection valve and which connects a compression bottom with a top side of the cylinder head. Coolant bores extend in direct proximity to inlet and outlet ports from a circumference of the cylinder head to an interior water space of the cylinder head.

5 Claims, 3 Drawing Sheets

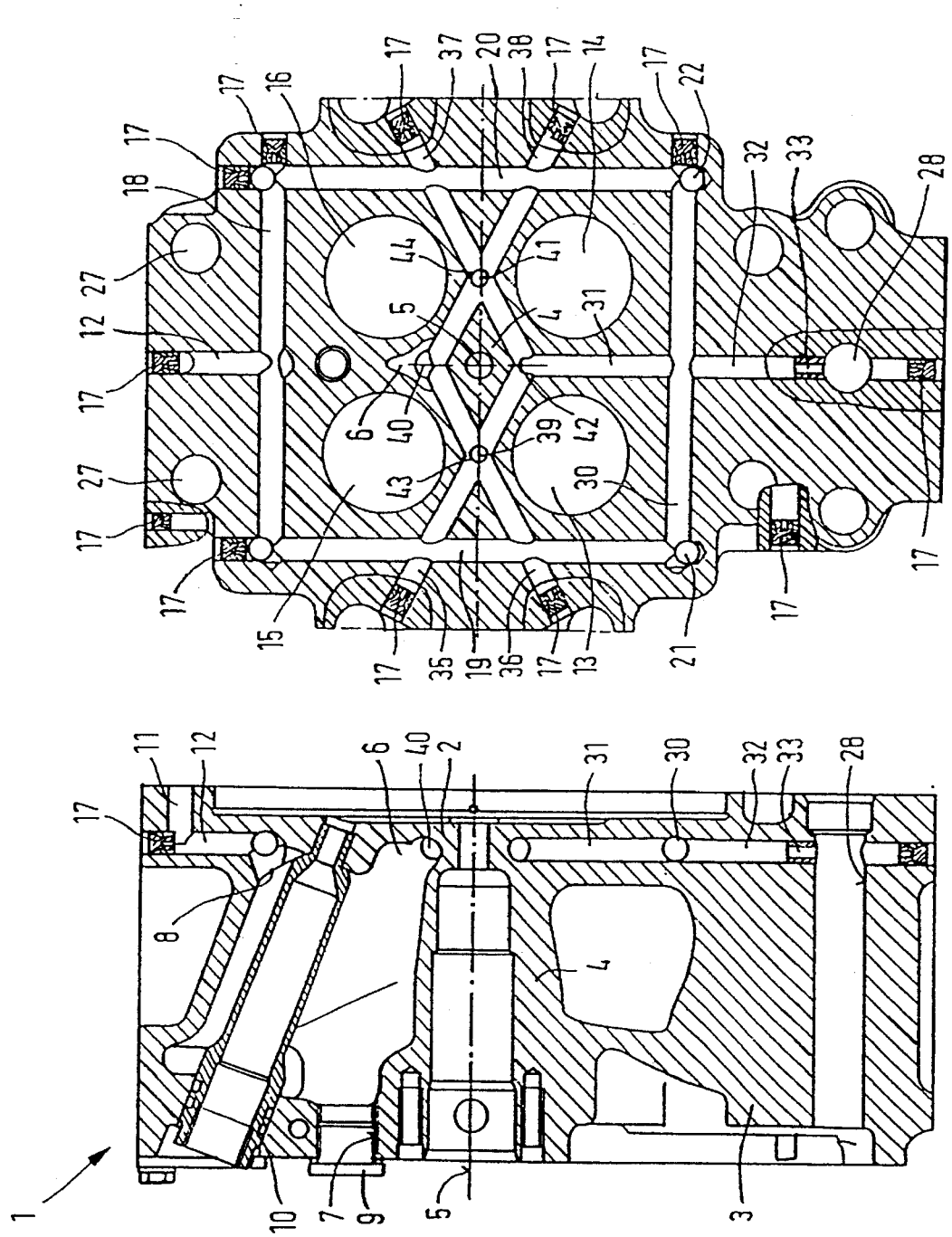

INTERNAL-COMBUSTION ENGINE CYLINDER HEAD

BACKGROUND AND SUMMARY OF THE INVENTION

The present invention relates to an internal-combustion engine cylinder head comprising four valves and an injection valve arranged in the center, and more particularly, to a cylinder head comprising a closed runner arranged concentrically to an injection valve axis and connecting a compression bottom with a top side of the cylinder head, feeding bores and two additional supply bores for permitting coolant flows to the cylinder head, bores extending from the feeding bores to an interior coolant space of the cylinder head, a collecting pipe through which coolant is conveyed from the interior coolant space of the cylinder head, and two inlet ports for air and two outlet ports for exhaust gases of the internal-combustion engine.

Cylinder heads are known which, for optimizing combustion, are equipped with four valves on two inlet and two outlet ports, respectively, and with an injection valve arranged in the center in the cylinder head. In such cylinder heads, special attention must be paid to the fact that coolant is guided as closely as possible past the valve seats and the injection valves so that the heat resulting from the combustion can be carried away without any impairment of the stability of the combustion-space-side compression bottom of the cylinder head which is highly stressed by heat and ignition pressure.

For improving the stability of cylinder heads comprising four valves on two inlet and two outlet ports and an injection valve arranged in the center in the cylinder head, a closed runner is arranged in the center around the injection valve. The runner connects the compression bottom with a top side of the cylinder head so that forces onto the compression bottom can be removed in a far-reaching manner in the cylinder head. The runner is contained from the compression bottom to the top side of the cylinder head in a coolant space which is bounded by precast walls for the inlet and outlet ports. Coolant flows through bores in the compression bottom, enters the coolant space surrounding the runner while being centrally aimed at the injection valve and is discharged from the cylinder head by way of a collecting pipe.

The known approach has a disadvantage, however, in that the coolant space arranged centrally around the injection valve and the arrangement of the bores for the coolant limit the design possibilities for the inlet and outlet ports in the cylinder head. A further disadvantage is that the amount of coolant flowing around the valve seats on the inlet and outlet ports in the cylinder head is not sufficient.

It is an object of the present invention to provide a cylinder head having a high stability, good cooling characteristics and improved design possibilities for inlet and outlet ports.

This object has been achieved in accordance with the present invention by a cylinder head for internal-combustion engines in which the inlet ports are cast to the runner. Transverse bores are contained in the compression bottom. The first transverse bores intersect at an obtuse angle the first coolant bore, and second transverse bores intersecting at an obtuse angle the second coolant bore. The first transverse bores intersect at a point, and the second transverse bores intersecting at another point. A first and a second transverse bore meet at a point, and the respective other transverse bores lead through an overflow opening eccentrically between the outlet ports into the interior coolant space.

For improving the combustion, the intake ports in the cylinder head according to the present invention are provided with a profile so that the intake air is acted upon by a swirl. In order to be able to produce this profile, the inlet ports are cast to a bore arranged in the center in the cylinder head so that a separate wall, and therefore a coolant space on an inlet side of the bore, is omitted.

According to the present invention, bores for the coolant extend in the compression bottom of the cylinder head in such that inlet ports cast onto the bore for generating a swirl as well as outlet ports not cast on the bore in the proximity of valve seats are surrounded on all sides by coolant. By way of these bores, the coolant is fed to a coolant space of the cylinder head situated between the outlet ports. The bores for the coolant lead out on an eccentric overflow bore between the outlet ports into the coolant space.

According to a further feature of the present invention, additional bores for coolant are advantageously provided on the inlet ports of the cylinder head. Thereby the cylinder head is cooled uniformly on the inlet and the outlet side, and thermal stresses in the cylinder head are reduced. Another bore on the side of the inlet ports in the cylinder head simplifies the machining of the cylinder head.

In yet another advantageous aspect of the present invention, the coolant bores intersect at points which are connected by overflow bores with the interior coolant space for improving the coolant throughput through the cylinder head. For a uniform flow and for lowering the flow resistance of the bores for the coolant, the precast overflow bores are finished mechanically.

BRIEF DESCRIPTION OF THE DRAWINGS

These and other objects, features and advantages of the present invention will become more readily apparent from the following detailed description thereof when taken in conjunction with the accompanying drawings wherein:

FIG. 3 is a cross-sectional view of a cylinder head according to the present invention;

FIG. 4 is a cross-sectional view parallel to the compression bottom of a cylinder head according to the present invention;

DETAILED DESCRIPTION OF THE DRAWINGS

Figures 1, 2:
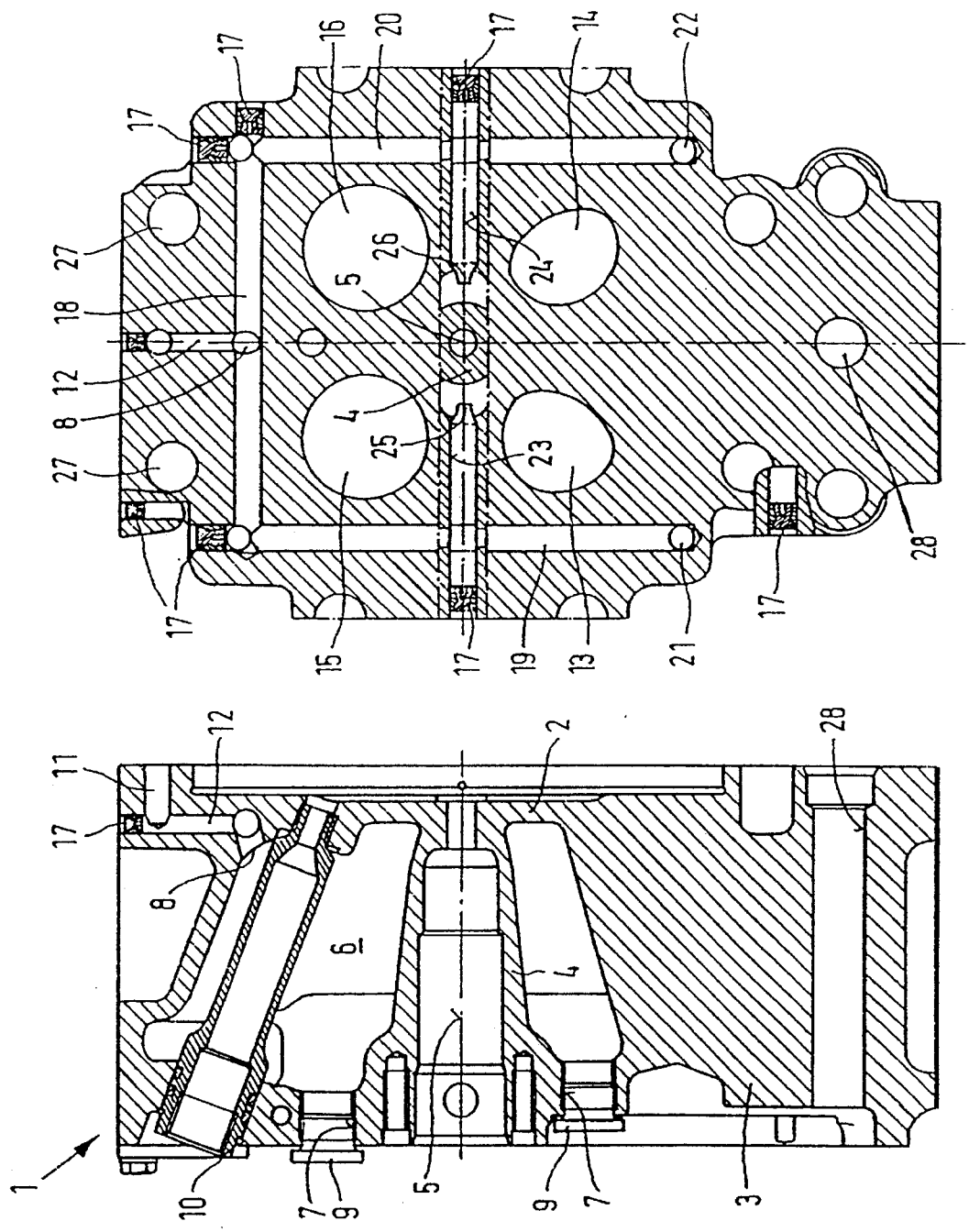
FIG. 1 is a cross-sectional view of a prior art cylinder head.
FIG. 2 is a cross-sectional view parallel to the compression bottom of a cylinder head according to FIG. 1.

According to FIG. 1, a known one-piece cast cylinder head 1 is rotated in the drawing 90° to its generally normal position, for ease of illustration. The cylinder head comprises an essentially flat compression chamber side 2, a top side 3 and a bore 4 which is concentric with respect to the perpendicular axis 5 of an injection valve (not shown) arranged in the center thereof. Between the compression chamber side 2 and the side 3, a closed interior coolant space 6 extends around the bore 4. Openings 7 closed off by screw plugs 9 and a holding device 10 for a preheating device (not shown) are contained in the cylinder head 1.

Coolant bores 11, 21, 22 feed the coolant from the cylinder wall (not shown) is fed to the cylinder head 1. A straight bore 12 is arranged at a right angle with respect to the bore 11 and in parallel to the compression chamber side 2. The bore 12 is directed to the perpendicular axis 5 branches off the bore 11 and leads through an opening 8 into the interior coolant space 6. The coolant is preferably water. The bore 12 is closed off to the outside by a sealing stopper 17.

FIG. 2 shows precast inlet ports 13, 14 and outlet ports 15, 16 in the cylinder head 1 arranged around the axis 5 of the injection valve. The precast inlet ports 13, 14 have no swirl profile. The walls of the inlet ports 13, 14 and of the outlet ports 15, 16 are separated from the wall of the bore 4. Bores 23, 24 are situated between inlet and outlet ports 13, 14, and 15, 16, respectively, and are transverse to the perpendicular axis 5 of the injection valve.

A straight bore 18 is parallel to the compression chamber side 2, adjoins the bore 12 at a right angle and extends to the circumference of the cylinder head 1. Bores 19, 20 extend at a right angle from the bore 18 and parallel to the compression bottom 2 of the cylinder head 1 to bores 21, 22. Bores 23, 24 branch off at a right angle with respect to the bores 19, 20 and parallel to the compression bottom 2, and extend toward the perpendicular axis 5 of the bore 4. In the center, by way of openings 25, 26, the bores 23, 24 lead into the interior coolant space 6. The bores 18, 19, 20, 23 and 24 are sealed off to the outside by the sealing stoppers 17.

A collecting pipe (not shown) transfers the coolant from the coolant space 6 to an adjacent cylinder head (not shown) and, on a face of the internal-combustion engine. The coolant then enters into a coolant collecting pipe (not shown) which receives the coolant of all cylinder heads 1 of the internal-combustion engine.

Fastening devices (not shown) mount the cylinder head 1 in bores 27 of the cylinder wall. A bore 28 is coaxial with respect to the bores 27.

As seen in FIGS. 3 and 4, corresponding elements of the cylinder head have the same reference numbers as similar elements in FIGS. 1 and 2. The inlet ports 13, 14 are cast onto the bores 4 and are provided with profiles (swirl port) for generating in a known way a swirl for the taken-in air. The outlet ports 15, 16 are not cast onto the bore 4. In the proximity of the compression bottom 2, the coolant space 6 is arranged eccentrically between the bore 4 and the walls of the outlet ports 15, 16.

An additional bore 30 connects the bores 19, 20, 21, 22. A bore 31 extends in the compression bottom 2 coaxially with respect to the bore 12 and aimed at the axis 5 of the injection valve. A bore 32, which intersects bore 28 of the cylinder head 1, extends coaxially with respect to bore 12 and is directed away from the axis 5 of the injection valve. A sealing stopper 33 closes the bore 32 off with respect to the bore 28 and another sealing stopper 17 closes the bore 32 off with respect to the outside.

Bores 35, 36 intersect bore 19 at an obtuse angle, and bores 37 and 38 intersect bore 20 at an obtuse angle. Bores 35, 36 are centrically symmetrical to bores 37, 38 with respect to the axis 5 of the injection valve. Bore 35 extends from bore 19 into direct proximity with the outlet port 15, intersects bore 36 at an intersecting point 39, passes by in the direct proximity to the inlet port 13 and, at an intersecting point 42, leads into the bore 31. Bore 36 extends from bore 19 into the direct proximity to the inlet port 13, intersects bore 35 in the intersecting point 39, passes by in direct proximity with the outlet port 15 and leads between the outlet ports 15, 16 into a precast or machined eccentric overflow bore 40. The latter leads to the interior coolant space 6.

Bore 37 extends from bore 20 into the direct proximity to the outlet port 16, intersects bore 38 at an intersecting point 41, passes by in the direct proximity to the inlet port 14 and, at intersecting point 42, leads into the bore 31. Bore 38 extends from bore 20 into the direct proximity to the inlet port 14, intersects bore 37 at the intersecting point 41, passes by in the direct proximity to the outlet port 16 and leads between the outlet ports 15, 16 into the precast or machined eccentric overflow opening 40. The latter leads to the interior coolant space 6. The bores 30, 31, 32, 35, 36, 37, 38 extend in a plane parallel to the compression chamber side 2 and are sealed off to the outside by the sealing stoppers 17.

According to an advantageous further feature of the present invention, additional overflow bores 43, 44 to the interior coolant space 6 are provided in the cylinder head at the intersecting points 39, 41 of the bores 35, 36, 37, 38. For lowering the flow resistance and for a uniform flow through the cylinder head 1, precast overflow bores 40 may be finished mechanically.

Figure 6:
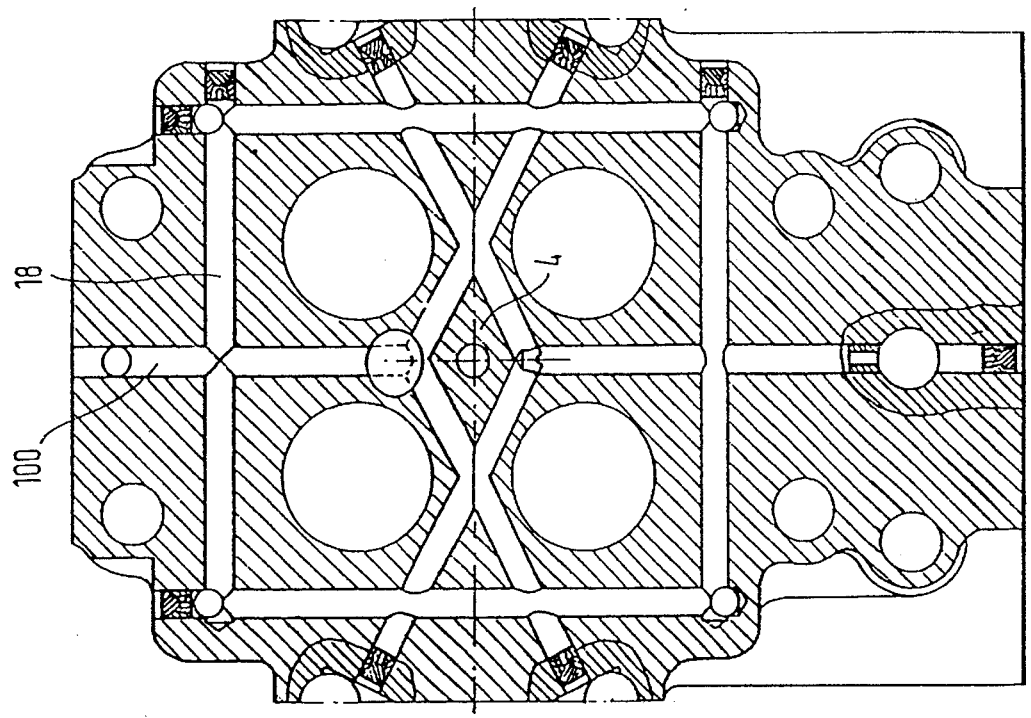
FIG. 6 is a cross-sectional view parallel to the compression bottom of the cylinder head according to FIG. 5 and corresponding to the intersection line in FIG. 5.
Figure 5:
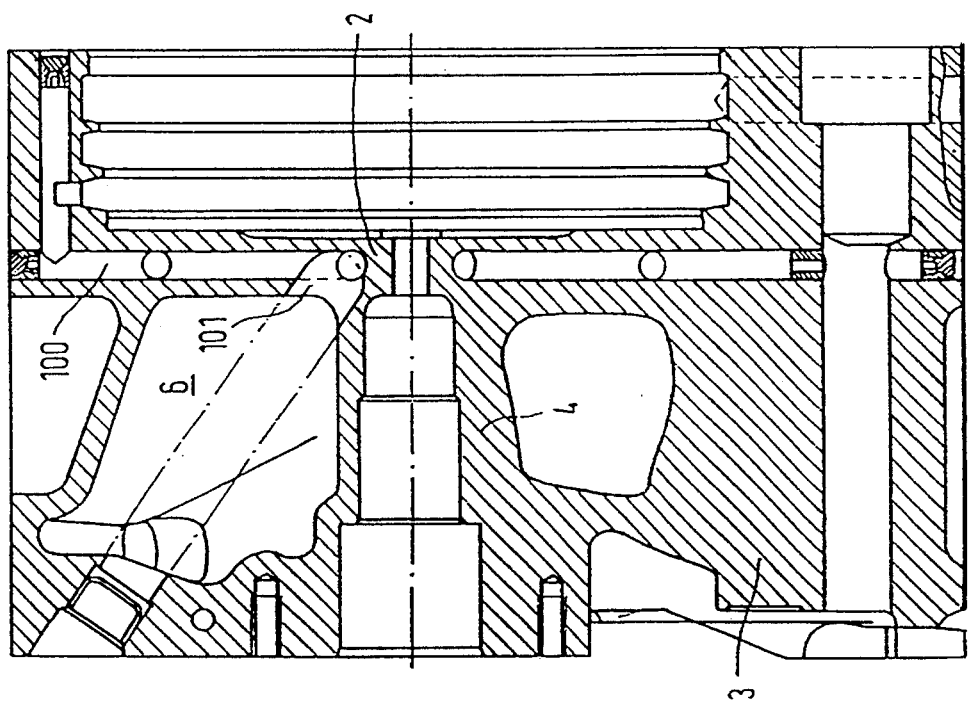
FIG. 5 is a cross-sectional view of a cylinder according to the present invention but without a heater plug.

In the embodiment of a cylinder head illustrated in FIGS. 5 and 6, the cylinder head has no heater plug. All bores and areas correspond essentially to the embodiments illustrated in FIGS. 1 to 4. An additional bore 100 is, however, provided in the cylinder head. The coolant discharge into the space 6 takes place by a bore 101 preferably produced by mechanical finishing.

The cylinder heads 1 according to the present invention are provided particularly for use in supercharged diesel engines where a particularly high ignition pressure results in a high stress to the compression chamber side 2.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An internal-combustion engine cylinder head with four valves and an injection valve arranged in a center area thereof, comprising a bore arranged concentrically with respect to a central axis of the injection valve wherein the bore connects a compression chamber side of the cylinder head with side of the cylinder head, feeding bores in the cylinder head for flowing coolant to the cylinder head, coolant bores connecting the feeding bores to an interior coolant space of the cylinder head, a collecting pipe through with the coolant is conveyed from the interior coolant space of the cylinder head to another cylinder head, two inlet ports for air and two outlet ports for exhaust gases of the internal-combustion engine arranged in the cylinder head, and an overflow bore arranged between the outlet ports, wherein the inlet ports are cast to the bore, first and second sets of transverse bores are provided in the compression chamber side, the first set of the transverse bores intersect a first of the coolant bores at an obtuse angle, and the second set of transverse bores intersect a second of the coolant bores at an obtuse angle, with the first set of transverse bores intersecting at a first point and the second set of transverse bores intersecting at a second point, a respective first and a second set of transverse intersects at a third point, and additional transverse bores lead through the overflow bore into the interior coolant space.

2. The cylinder head according to claim 1, wherein coolant bores are arranged in the compression bottom, one of the coolant bores in the compression bottom connecting coolant bores, and another of the coolant bores in the compression bottom extending perpendicularly to the one coolant bore directed at the injection valve axis to the intersecting point between the inlet ports.

3. The cylinder head according to claim 1, wherein another coolant bore is arranged in the compression bottom and extends perpendicularly to the one coolant bore leading away from the injection valve axis to a further bore.

4. The cylinder head according to claim 1, wherein additional overflow bores are provided from the intersecting points of the bores into the interior coolant space.

5. The cylinder head according to claim 1, wherein the overflow bore is produced in one of a mechanically finished manner and a mechanical manner.

* * * * *